United States Patent
Willeke et al.

(10) Patent No.: US 10,374,980 B1
(45) Date of Patent: Aug. 6, 2019

(54) HARD ZONING OF VIRTUAL LOCAL AREA NETWORKS IN A FIBRE CHANNEL FABRIC

(71) Applicant: AVAGO TECHNOLOGIES INTERNATIONAL SALES PTE. LIMITE, Singapore OT (SG)

(72) Inventors: Jesse Willeke, Broomfield, CO (US); Kiran Sangappa Shirol, San Jose, CA (US); Chandra Mohan Konchada, San Ramon, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 287 days.

(21) Appl. No.: 15/299,767

(22) Filed: Oct. 21, 2016

(51) Int. Cl.
*G06F 15/16* (2006.01)
*H04L 12/931* (2013.01)
*H04L 12/46* (2006.01)
*H04L 29/08* (2006.01)

(52) U.S. Cl.
CPC ........ *H04L 49/357* (2013.01); *H04L 12/4675* (2013.01); *H04L 67/1097* (2013.01)

(58) Field of Classification Search
CPC ............... H04L 29/06; H04L 29/12056; H04L 29/12886; H04L 49/65; H04L 49/351; H04L 49/354; H04L 49/357; H04L 67/40; H04L 67/1097
USPC .................................. 709/212, 220, 225, 245
See application file for complete search history.

(56) References Cited

U.S. PATENT DOCUMENTS

| | | |
|---|---|---|
| 6,765,919 B1 | 7/2004 | Banks et al. |
| 6,980,525 B2 | 12/2005 | Banks et al. |
| 7,120,128 B2 | 10/2006 | Banks et al. |
| 7,120,728 B2 | 10/2006 | Krakirian et al. |
| 7,167,472 B2 | 1/2007 | Wu et al. |
| 7,283,486 B2 | 10/2007 | Banks et al. |
| 7,352,740 B2 | 4/2008 | Hammons et al. |
| 7,366,194 B2 | 4/2008 | Yu et al. |
| 7,430,203 B2 | 9/2008 | Millet et al. |
| 7,752,361 B2 | 7/2010 | Rangan et al. |
| 8,279,775 B2 | 10/2012 | Banks et al. |
| 8,599,847 B2 | 12/2013 | Pathak et al. |
| 8,730,840 B2 | 5/2014 | Banks et al. |
| 2004/0210656 A1* | 10/2004 | Beck ............... H04L 29/06 709/225 |

(Continued)

*Primary Examiner* — Farzana B Huq
(74) *Attorney, Agent, or Firm* — Xsensus LLP

(57) ABSTRACT

A network where FC and Ethernet storage traffic share the underlying network. The network extends FC SAN storage specific attributes to Ethernet storage devices. The network is preferably formed of FC switches, so each edge switch acts as an FCoE FCF, with internal communications done using FC. IP packets are encapsulated in FC packets for transport. Preferably, either each outward facing switch port can be configured as an Ethernet or FC port, so devices can be connected as desired. FCoE devices connected to the network are in particular virtual LANs (VLANs). The name server database is extended to include VLAN information for the device and the zoning database has automatic FCO-E_VLAN zones added to provide a mechanism for enhanced soft and hard zoning. Zoning is performed with the conventional zoning restrictions enhanced by including the factor that any FCoE devices must be in the same VLAN.

14 Claims, 15 Drawing Sheets

(56) References Cited

U.S. PATENT DOCUMENTS

| | | | |
|---|---|---|---|
| 2006/0023726 A1* | 2/2006 | Chung | H04L 12/462 |
| | | | 370/398 |
| 2008/0159171 A1 | 7/2008 | Banks et al. | |
| 2011/0103258 A1* | 5/2011 | Chung | H04L 67/1097 |
| | | | 370/254 |
| 2011/0268120 A1 | 11/2011 | Vobbilisetty et al. | |
| 2011/0268125 A1 | 11/2011 | Vobbilisetty et al. | |
| 2011/0286357 A1 | 11/2011 | Haris et al. | |
| 2011/0292947 A1 | 12/2011 | Vobbilisetty et al. | |
| 2011/0299391 A1 | 12/2011 | Vobbilisetty et al. | |
| 2011/0299535 A1 | 12/2011 | Vobbilisetty et al. | |
| 2014/0269745 A1 | 9/2014 | Johnson et al. | |
| 2014/0301402 A1 | 10/2014 | Wenig et al. | |
| 2016/0087845 A1* | 3/2016 | Kaneriya | H04L 49/351 |
| | | | 370/254 |

\* cited by examiner

Fig. 16

| Zone name | PID | WWN |
|---|---|---|
| FCOE_VLAN_01_Zone | 010100 | 20:02:00:11:0d:63:2e:00 |
| FCOE_VLAN_01_Zone | 030200 | 20:03:00:ff:03:23:ee:00 |
| FCOE_VLAN_01_Zone | 030100 | 20:03:00:ff:05:a3:27:00 |
| FCOE_VLAN_02_Zone | 020100 | 20:04:11:35:59:ac:fe:00 |
| FCOE_VLAN_02_Zone | 040100 | 20:05:aa:51:77:d3:10:00 |
| Zone_A | 010100 | 20:02:00:11:0d:63:2e:00 |
| Zone_A | 030100 | 20:03:00:ff:05:a3:27:00 |
| Zone_B | 020100 | 20:04:11:35:59:ac:fe:00 |
| Zone_B | 040200 | 20:0a:4b:37:a8:62:23:00 |
| Zone_C | 010100 | 20:02:00:11:0d:63:2e:00 |
| Zone_C | 040100 | 20:05:aa:51:77:d3:10:00 |

| VLAN No. | Port Symbol | PID | WWN |
|---|---|---|---|
| 01 | H1 | 010100 | 20:02:00:11:0d:63:2e:00 |
| 01 | T1 | 030200 | 20:03:00:ff:03:23:ee:00 |
| 01 | T2 | 030100 | 20:03:00:ff:05:a3:27:00 |
| 02 | H2 | 020100 | 20:04:11:35:59:ac:fe:00 |
| 02 | T3 | 040100 | 20:05:aa:51:77:d3:10:00 |
|  | T4 | 040200 | 20:0a:4b:37:a8:62:23:00 |

1510  1508  1504  1506  1502

HARD ZONING OF VIRTUAL LOCAL AREA NETWORKS IN A FIBRE CHANNEL FABRIC

CROSS REFERENCE TO RELATED APPLICATIONS

This application is related to U.S. patent ApplicationsSer. No. 15/299,734, entitled "Address Resolution Protocol Operation in a Fibre Channel Fabric;" Ser. No. 15/299,756, entitled "Soft Zoning of Virtual Local Area Networks in a Fibre Channel Fabric;" and Ser. No. 15/209,741, entitled "Automatic Zoning of Virtual Local Area Networks in a Fibre Channel Fabric," all of which are filed concurrently herewith and are hereby incorporated by reference as if reproduced in their entireties.

BACKGROUND OF THE INVENTION

1. Field of the Invention

The invention relates to network switches and routers.

2. Description of the Related Art

Storage networking is becoming ever more complicated. Storage area networks (SANs) are used for block-level storage of data. File area networks (FANs) are used for file-level storage of data. FANs are commonly formed using Internet Protocol (IP) addressing on an Ethernet network or local area network (LAN) and the storage units are referred to as Network Attached Storage (NAS) units. SANs are commonly formed in several different ways. First, the Internet Small Computer System Interface (iSCSI) protocol, which is based on IP and Transmission Control Protocol (TCP), can be used over Ethernet networks. Second, the SAN can use Fibre Channel (FC) links and a fabric. Third, the SAN can be formed using the Fibre Channel over Ethernet (FCoE) protocol, which may be all over Ethernet or combined with an FC fabric and devices. As shown in FIGS. 1 and 2, two options for the storage units have been developed. In FIG. 1 NAS storage unit 102 and iSCSI storage unit 104 are connected to a LAN 106 and share the LAN 106 with all other LAN-connected devices. FC storage units 108, no, 112 are connected to an FC SAN 114. Each server 116 includes a network interface card (NIC) 118 to connect to the LAN 106 and a host bus adapter (HBA) 120 to connect to the SAN 114. The LAN 106 and the SAN 114 are connected to a wide area network (WAN) or the Internet 122 to allow external communication. In FIG. 2 NAS storage unit 102 and iSCSI storage units 104, 124 have been placed on their own dedicated IP storage network 126. In some embodiments, an additional NIC 128 is provided to connect to the IP storage network 126 to avoid mixing LAN traffic and IP storage traffic even at the top of rack (TOR). In FIG. 1 traffic quality and security is compromised as IP storage traffic and general IP traffic share the same LAN 106, while FIG. 2 adds complexity by adding the IP storage network 126 and a second NIC 128. Further, there are potential administrative issues that may result between storage administrators and network administrators in the various configurations.

SUMMARY OF THE INVENTION

A network according to the present invention provides a Unified Storage Fabric (USF), which is a network where FC and Ethernet storage traffic share the underlying network, which is optimized for storage traffic. USF extends FC SAN storage specific attributes—high performance, lossless, equal cost multi-path (ECMP) routing, storage specific analytics, etc.—to Ethernet storage devices. As the USF is preferably formed of FC switches, each edge USF switch acts as an FCoE Fibre Channel Forwarder (FCF) for FCoE operations, with internal communications done using FC. IP packets are encapsulated in FC packets for transport through the USF. Preferably each outward facing or edge USF port on a USF switch can be configured as either an Ethernet port or a FC port, so devices can be connected as desired.

FCoE devices connected to the USF are in particular virtual LANs (VLANs). To allow the USF to restrict communications between FCoE devices to those devices in the same VLAN, the name server database is extended to include VLAN information for the device and the zoning database has automatic FCOE_VLAN zones added to provide a mechanism for enhanced hard zoning. Reference to the VLAN information in the name server database and the FCOE_VLAN zone information in the zoning database allows soft zoning and hard zoning to be performed with the conventional zoning restrictions enhanced by including the factor that any FCoE devices must be in the same VLAN.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIG. 15 is a name server database table according to the present invention.

FIG. 16 is a zoning table according to the present invention.

DETAILED DESCRIPTION OF THE PREFERRED EMBODIMENTS

A network according to the present invention provides a Unified Storage Fabric (USF), which is a network where FC and Ethernet storage traffic share the underlying network, which is optimized for storage traffic. The USF extends FC SAN storage specific attributes—high performance, lossless, ECMP, storage specific analytics, etc.—to Ethernet storage devices.

Generally a USF:

Supports FC and Ethernet based storage protocols on a Fibre Channel-based switch.

Provides an isolated storage fabric separate from a data network.

Supports IP storage protocols. Generally, iSCSI and NAS, most commonly Server Message Block (SMB)/Common Internet File System (CIFS) and Network File System (NFS), fall into this category. However, any future storage protocols that work on a generic IP network can also be supported.

Within this document, "Ethernet storage protocol" generally refers to FCoE, iSCSI and NAS, while "IP storage protocol" generally refers to iSCSI and NAS.

Supports FCoE and IP-based storage protocol within the same fabric.

Supports RDMA over converged Ethernet (RoCE) and internet wide area RDMA protocol (iWARP) for Ethernet.

Provides L2 and L3 TOR connectivity.

Supports Ethernet storage protocols across subnets. i.e. hosts and storage units in different subnets.

Supports Ethernet storage protocols in addition to FC protocol without affecting the FC protocol adversely.

Integrates seamlessly into an existing Ethernet infrastructure.

Generally minimizes Ethernet features to provide simplified Ethernet storage fabric management and topology.

Figure 1:
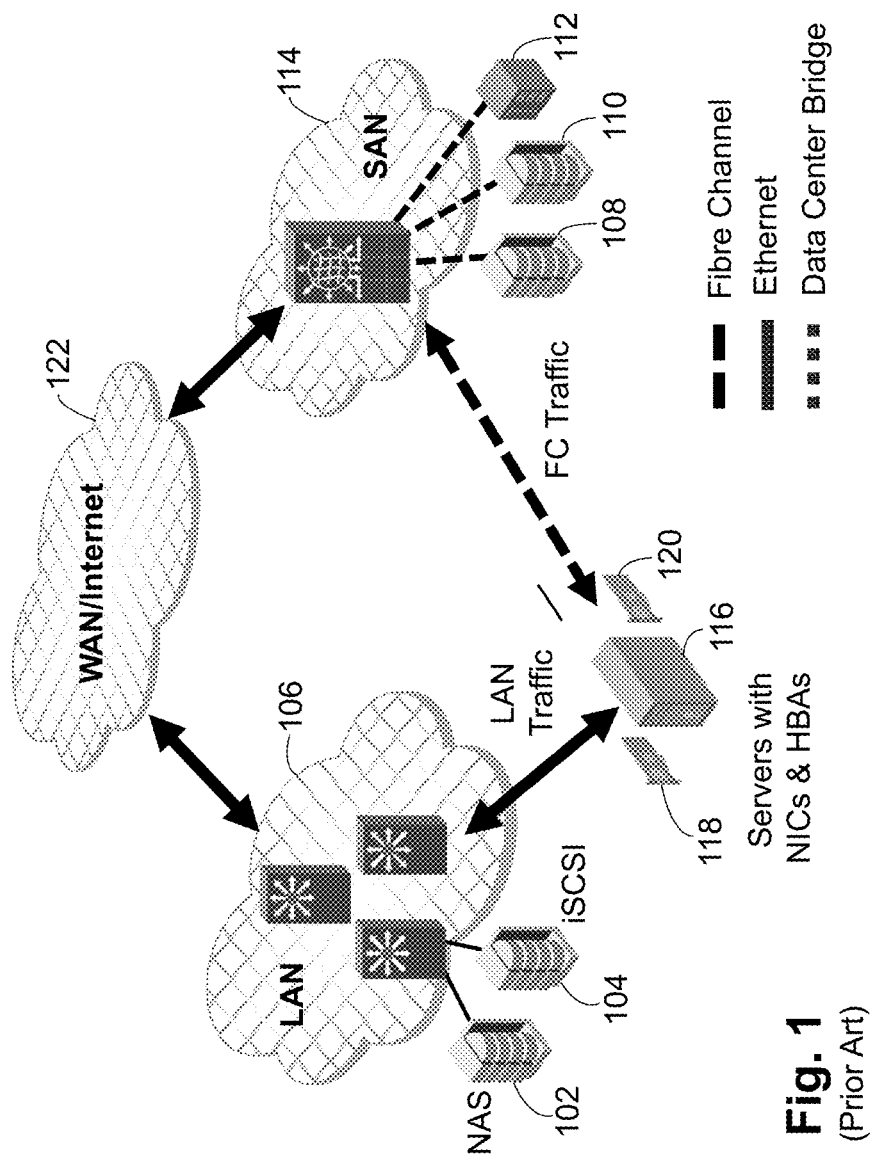
FIG. 1 is a block diagram of a first embodiment of a prior art network.
Figure 2:
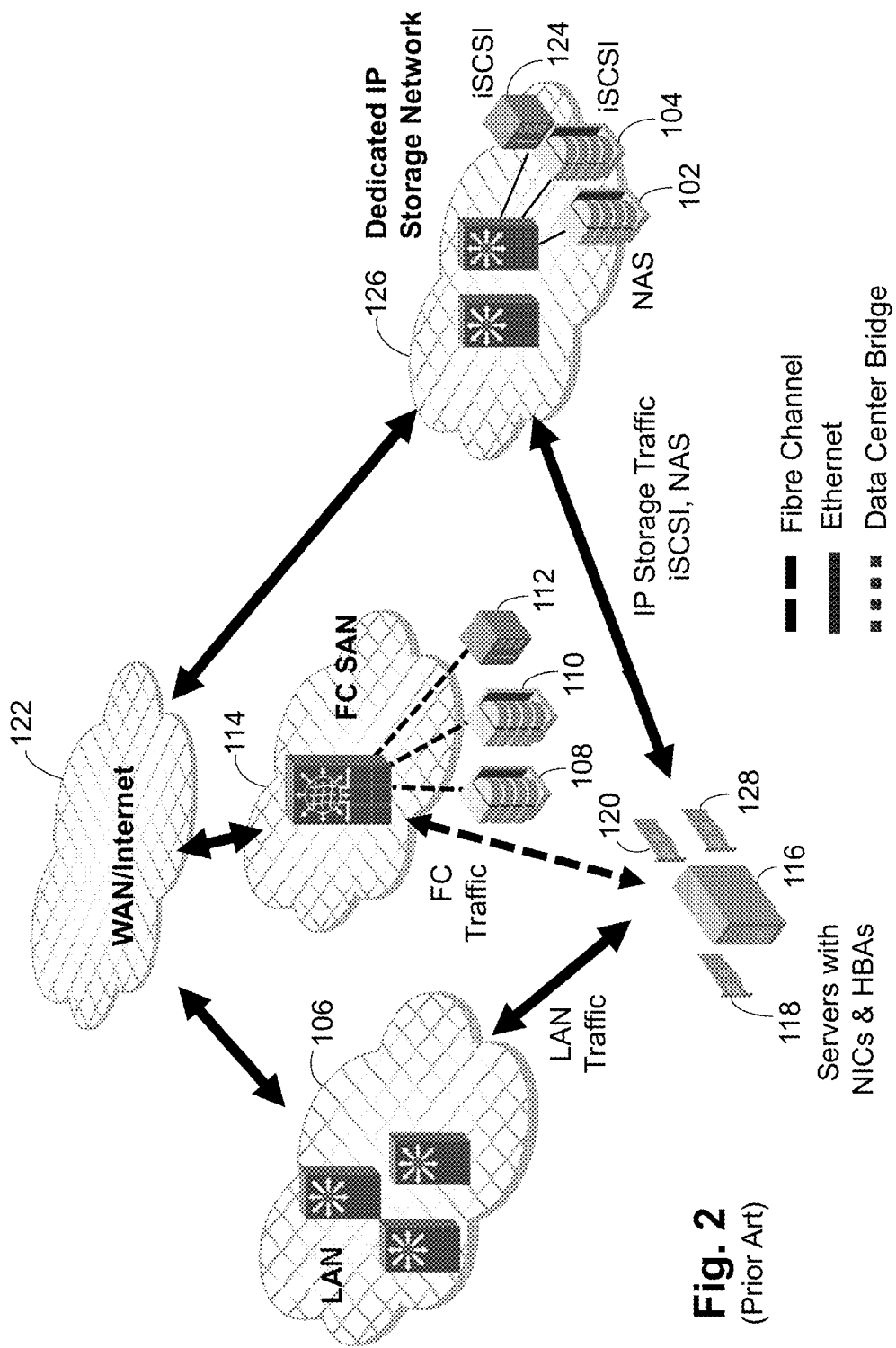
FIG. 2 is a block diagram of a second embodiment of a prior art network.
Figure 3:
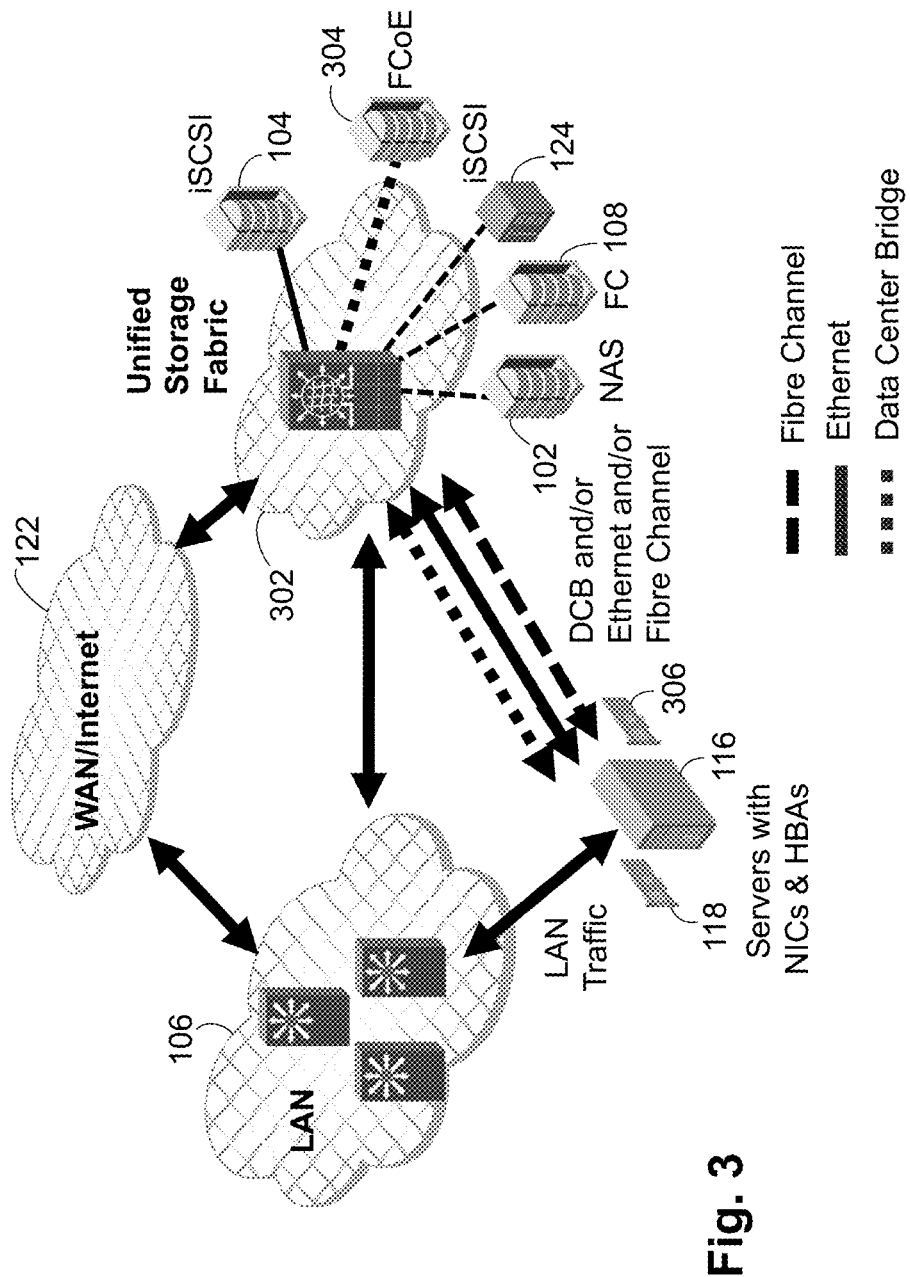
FIG. 3 is a block diagram of a first embodiment of a network according to the present invention.

A USF allows all storage protocols to coexist within a single storage optimized fabric. For example, see FIGS. 3 and 4. In FIG. 3, a USF 302 has attached a NAS storage unit 102, iSCSI storage units 104, 124, FC storage unit 108 and an FCoE storage unit 304. The server 116 has an adapter or adapters 306 as needed for the various protocols. For example, an HBA is needed for FC communications but a converged network adapter (CNA) or a NIC can be used for iSCSI, NAS and FCoE communications. A single NIC that can use different VLANs to separate the iSCSI, NAS and FCoE packets can be used instead of having a separate NIC for each protocol. There are as many links as needed between the server 116 and the USF 302 to accommodate the desired protocols.

Figure 4:
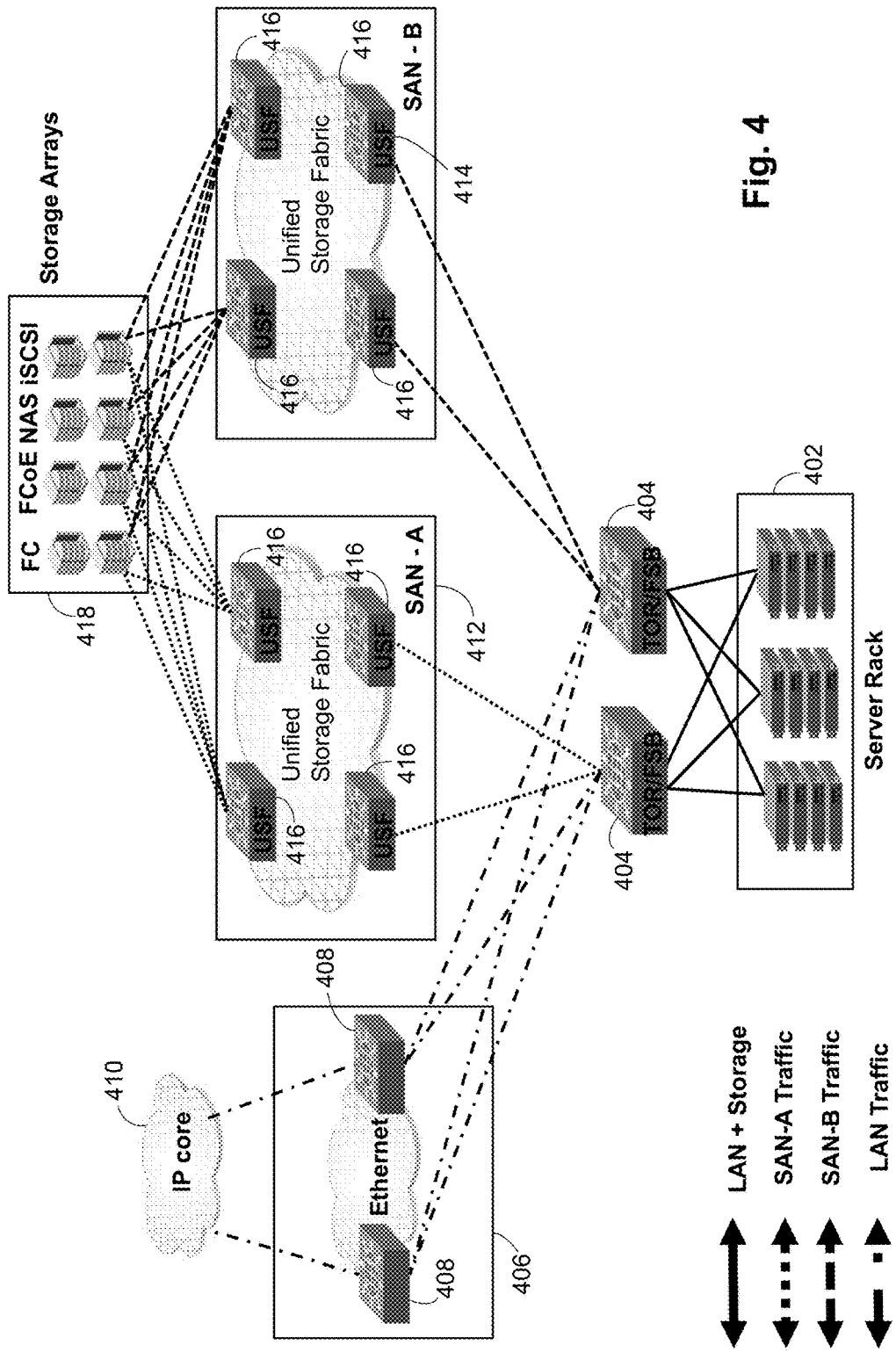
FIG. 4 is a block diagram of a second embodiment of a network according to the present invention.

FIG. 4 is an alternate embodiment configured for redundancy of the USF. Conventional storage units and HBAs, NICs and CNAs include two ports to allow connection to redundant fabrics. The use of multipath techniques allows continued communication even if a single fabric fails. In the embodiment of FIG. 4, all communications from the servers is done using Ethernet, so FCoE is used with FC storage units. A plurality of servers are contained in a server rack 402. The server rack 402 has two TOR/FIP snooping bridge (FSB) switches 404, so that each server is connected to each TOR/FSB switch 404. Each TOR/FSB switch 404 is connected to an Ethernet switch 408 in a LAN 406. The switches 408 connect to an IP core 410, such as the Internet or another LAN. There are two parallel, redundant SANs, SAN A 412 and SAN B 414. Each SAN A 412 and SAN B 414 is a USF formed of a series of USF switches 416. Each TOR/FSB switch 404 is connected to two USF switches 416 in one of SAN A 412 or SAN B 414. Each of SAN A 412 and SAN B 414 has two USF switches 416 connected to each storage unit in the storage array 418. This configuration provides redundancy at the SAN level and inside each SAN. The TOR/FSB switch 404 splits the traffic into general data network vs. USF. This configuration allows for data vs. storage Ethernet traffic segregation that both network and storage admins are looking for and yet minimizes the number of NICs needed in each server.

Figure 5:
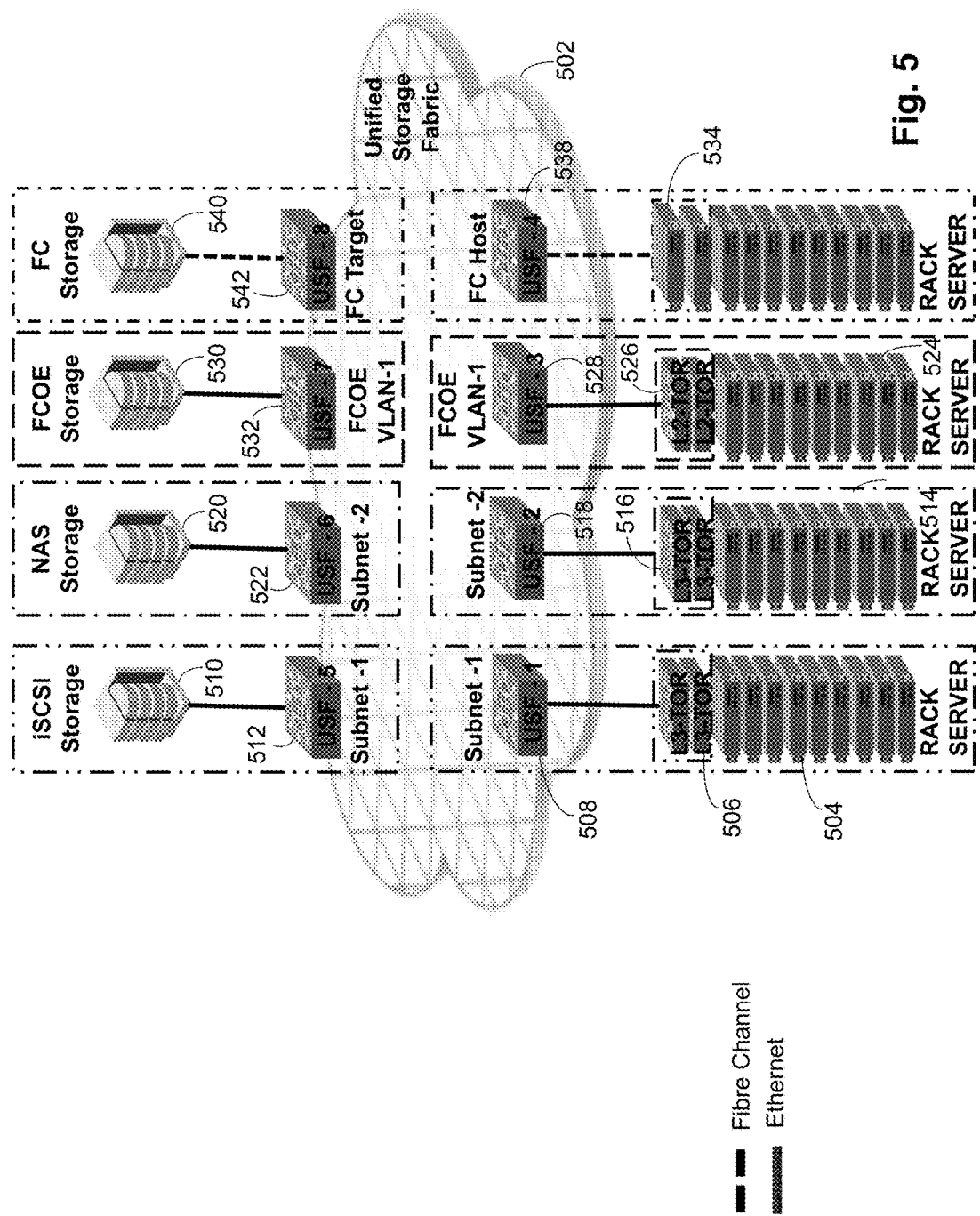
FIG. 5 is a block diagram of a third embodiment of a network according to the present invention.

However, even though all storage protocols are sharing the same underlying network, a USF does not provide protocol mapping or bridging. In other words, a host or server using a specific storage protocol generally remains bound to a target that is using the same storage protocol. See generally FIG. 5. FIG. 5 illustrates four different storage protocols, iSCSI, NAS, FCoE and FC. USF 502 includes subnet 1, which has rack servers 504 and related TOR Switches 506 connected to USF switch 1 508 and has iSCSI storage unit 510 connected to USF switch 5 512. USF 502 includes subnet 2, which has rack servers 514 and related TOR switches 516 connected to USF switch 2 518 and NAS storage unit 520 connected to USF switch 6 522. USF 502 includes FCoE VLAN 1, which has rack servers 524 and related TOR switches 526 connected to USF switch 3 528 and FCoE storage unit 530 connected to USF switch 7 532. Finally, rack servers 534 are connected to USF switch 4 538 using FC and FC storage unit 540 is connected to USF switch 8 542 using FC. Rack servers 504 in subnet 1 cannot communicate with NAS storage 520 in subnet 2, for example, as that is crossing from an iSCSI protocol boundary to a NAS protocol boundary. This configuration is conceptual, as a given server or host may use FCoE, iSCSI and NAS protocols all at the same time. In FIG. 5 the server is then considered as being in subnet 1 for iSCSI, subnet 2 for NAS and FCoE VLAN 1 for FCoE. Thus, each communication is bounded to targets that specifically speak the protocol.

The only exception to these protocol boundaries is FCoE, where hosts using the FCoE protocol can communicate with an FCoE target or an FC target, and vice versa. This is due to the nature of FCoE, where it was created to map FC on an Ethernet infrastructure.

Figure 6:
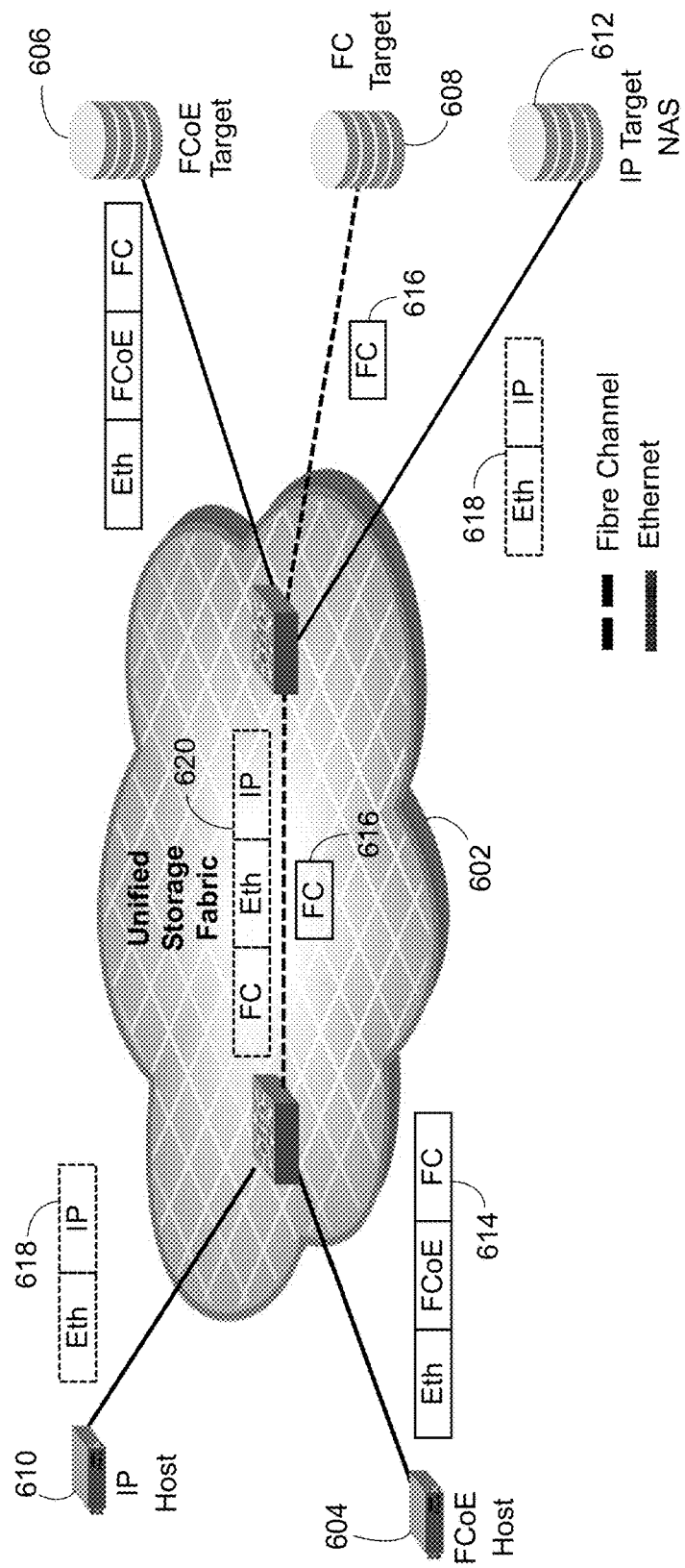
FIG. 6 is a first block diagram of a network according to the present invention illustrating packet flow for FCoE devices and for IP devices.

The allowed communication matrix within a USF is:

FC host↔FC target
FC host↔FCoE target
FCoE host↔FCoE target
FCoE host↔FC target
iSCSI host↔iSCSI target
NAS host↔NAS target As the USF is preferably internally formed of FC switches, each edge USF switch acts as an FCoE FCF for FCoE operations, with internal communications done using FC. Referring to FIG. 6, FCoE and IP storage packet flow is illustrated. A USF 602 has connected an FCoE host 604, an FCoE target 606, an FC target 608, an IP host 610 and an IP target 612, such as a NAS storage unit. The FCoE host 604 provides an FCoE packet 614 to the USF 602. The FCoE packet 614 has an Ethernet header with an FCoE Ethertype and an encapsulated FC packet. The USF 602 removes the Ethernet header and transmits the FC packet 616 internally in the USF. When exiting the USF 602 to the FCoE target 606, an FCoE frame with an Ethernet header with an FCoE Ethertype and the FC packet are sent to the FCoE target 606. If the FC target 608 is the destination, the FC packet is simply provided from the USF 602 to the FC target 608. The IP host 610 provides an Ethernet packet 618 with an IP payload, typically a TCP/IP payload, for use with the IP target 612. The USF 602 encapsulates the Ethernet packet 618 in an FC packet 620, which is routed through the USF 602. The Ethernet packet 618 is recovered and provided to the IP target 612.

Figure 7:
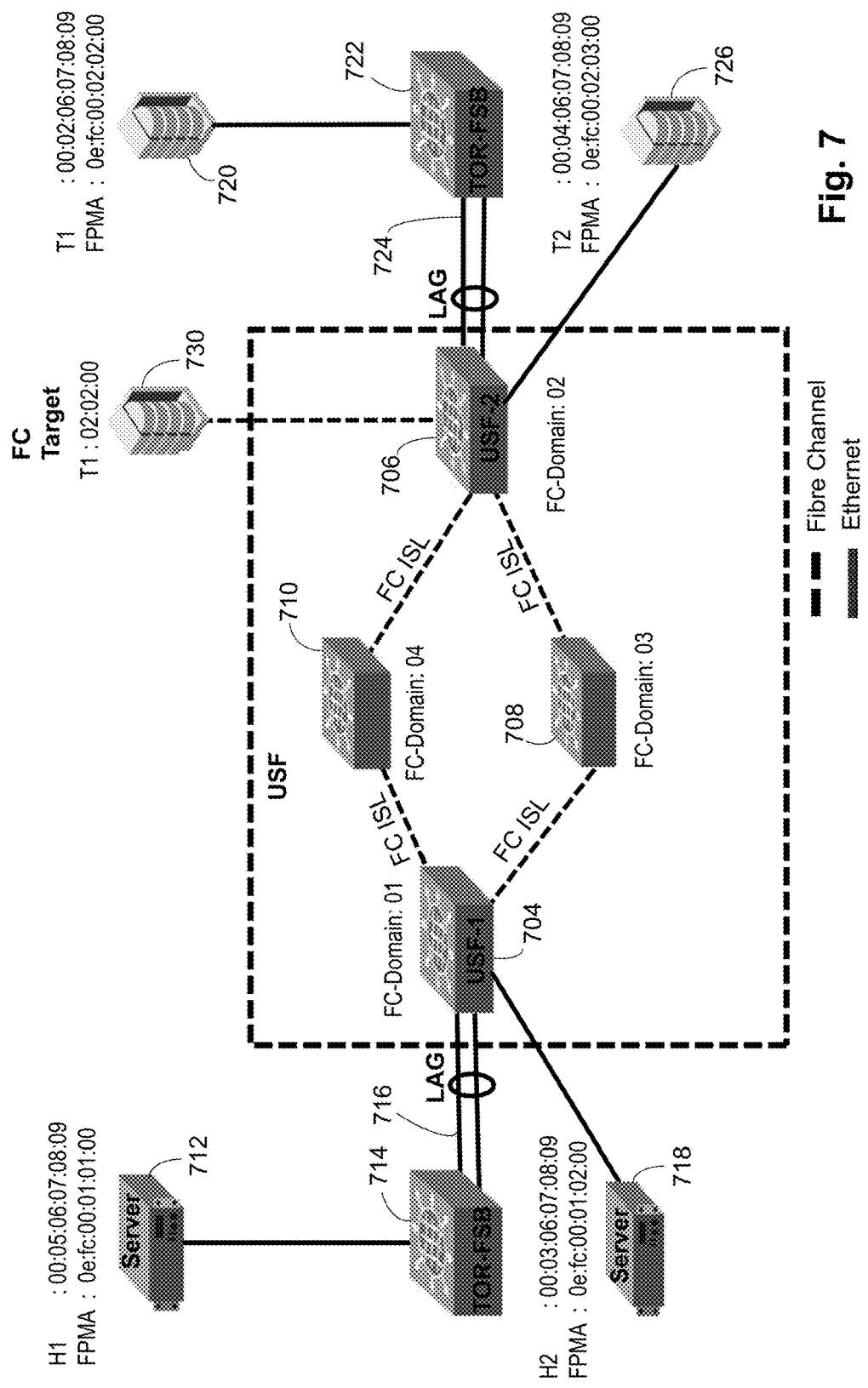
FIG. 7 is a second block diagram of a network according to the present invention illustrating packet flow for FCoE devices and between an FC device and an FCoE device.

FIG. 7 is an alternate embodiment illustrating the various Ethernet connections that are used with a USF. A USF 702 includes for USF switches 704, 706, 708, 710. As each USF switch has a FC back end, each USF switch also has an FC domain value. In the illustrated embodiment, USF switch 704 is domain 01, USF switch 706 is domain 02, USF switch 708 is domain 03 and USF switch 710 is domain 04. The USF switches 704, 706, 708, 710 are interconnected using FC interswitch links (ISLs). A server 712 having a native MAC address and a fabric provided MAC address (FPMA), as FCoE operations are being performed, is connected to a TOR/FSB switch 714. The TOR/FSB switch 714 is connected to the USF switch 704 using a link aggregation group (LAG) 716 for increased bandwidth. A second server 718 having a native MAC address and an FPMA is directly connected to the USF switch 704.

An FCoE storage unit 720 having a native MAC address and an FPMA is connected to a TOR/FSB switch 722. The TOR/FSB switch 7224 is connected to the USF switch 706 using a LAG 724. A second FCoE storage unit 726 having a native MAC address and an FPMA is directly connected to the USF switch 706. An FC storage unit 730 is directly connected to the USF switch 706.

In this embodiment only FCoE packets are being provided from the servers 712, 718, so the FCoE packets are received at USF switch 704, converted to FC packets, transmitted through the USF 702 to USF switch 706 and then converted back to FCoE packets if going to the FCoE storage units 720 or 726 or remaining as an FC packet if going to FC storage unit 730.

The above embodiments have shown both Ethernet and FC connections on a USF switch. Preferably, each outward facing or edge USF port on a USF switch is configurable as either an Ethernet port or an FC port, so devices can be connected as desired.

Figure 8:
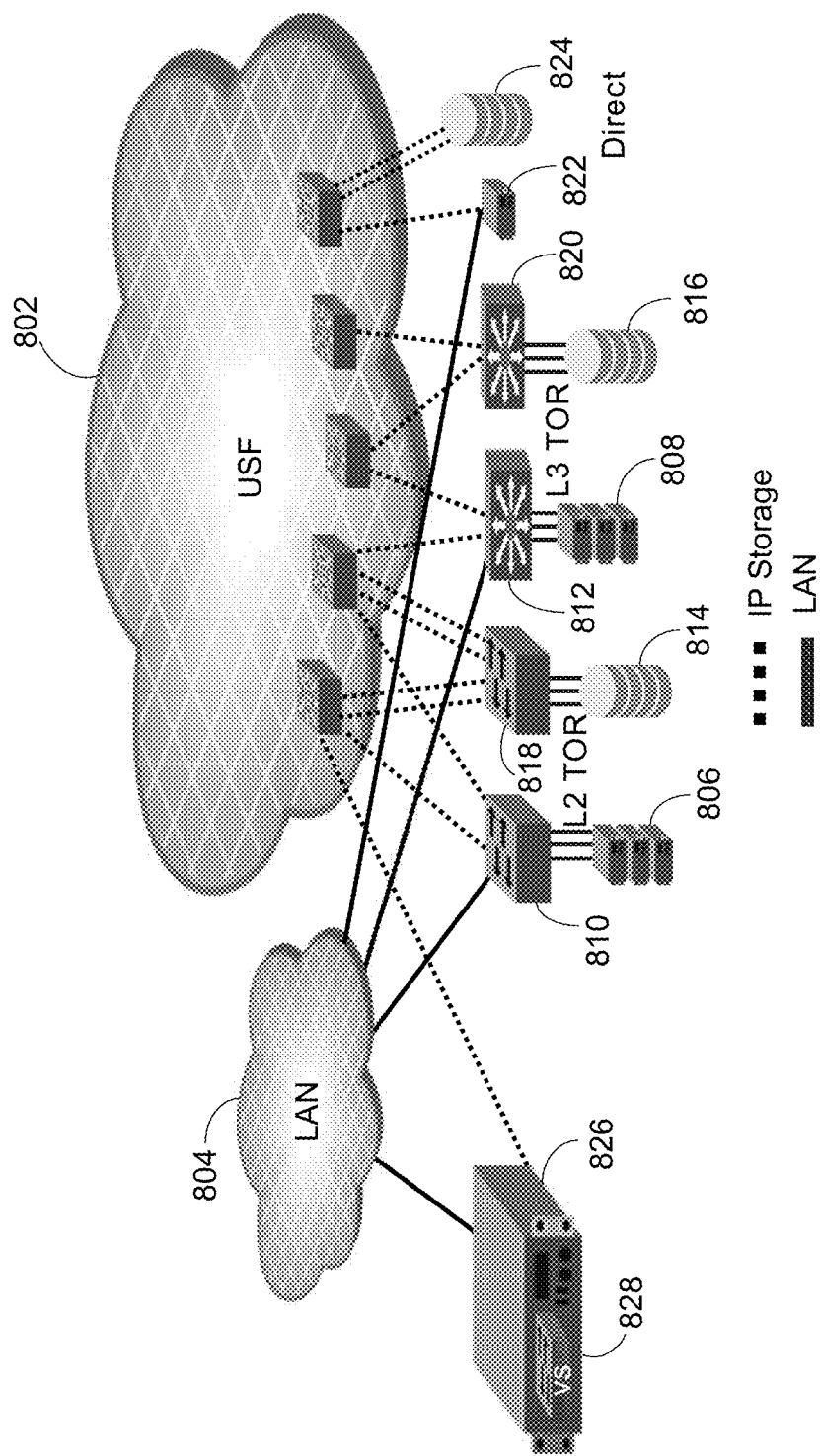
FIG. 8 is a block diagram of a network according to the present invention illustrating IP connection options and separation of storage and LAN traffic.

FIG. 8 provides an embodiment illustrating the various methods of connecting Ethernet servers/hosts and storage units. A USF 802 and a LAN 804 are shown. Hosts 806, 808 using Ethernet storage are most likely to connect to the USF 802 through an L2 TOR 810 or an L3 TOR 812. Ethernet storage units 814, 816, such as FCoE storage, iSCSI storage, or NAS storage, connect to the USF 802 through an L2 TOR 818 or an L3 TOR 820. Ethernet ports on these storage units 814, 816 most likely wholly belong to storage VLANs. These devices will directly communicate with hosts if belonging to the same TOR. They also communicate with hosts through the USF.

Hosts 822 connect to the USF 802 directly. In this case, the host 822 normally uses two separate Ethernet ports to directly split data vs. USF at the host level. Ethernet storage units 824 normally connect to the USF 802 directly. Ethernet ports on these storage units 824 normally connect to the USF 802 only.

A virtualization server 826 running a hypervisor and having a virtual switch 828 is shown as also directly connecting to the LAN 804 and the USF 802, like the hosts 822.

IP addresses are assigned to USF-connected devices through static or dynamic methods. The USF does not dictate a particular IP address assignment model and the USF does not rely on the model for discovery and routing. However, the USF does provide helper functions to aid in the dynamic model.

IP devices connected to the USF must have a valid IP address and an appropriate subnet mask. These IP addresses can be statically assigned to IP devices through a customer specific process or orchestration application such as vCenter™. If the device is expected to communicate outside of the resident subnet, a Gateway IP address is also provided.

When IP devices are assigned IP addresses through dynamic means, Dynamic Host Configuration Protocol (DHCP) protocol is used. In preferred embodiments, the USF does not provide native DHCP service but instead provides a DHCP relay service that allows IP devices to communicate with the customer's own DHCP server. When a DHCP request is received by a USF switch, the request is relayed to the customer's DHCP server through a management Ethernet port on a switch's front panel. This model assumes that the management Ethernet port is likely to be on the general data network with easy access to the customer's DHCP server.

When an IP device is resolving an IP address of a remote device to human readable host name, domain name system (DNS) is used. Preferably, the USF does not provide a native DNS service but does provide a DNS forwarder service that allows IP devices to communicate with the customer's own DNS server. When a DNS request is received by a USF switch, the request is forwarded to the customer's DNS server through a management Ethernet port on switch's front panel.

Figures 9, 10:
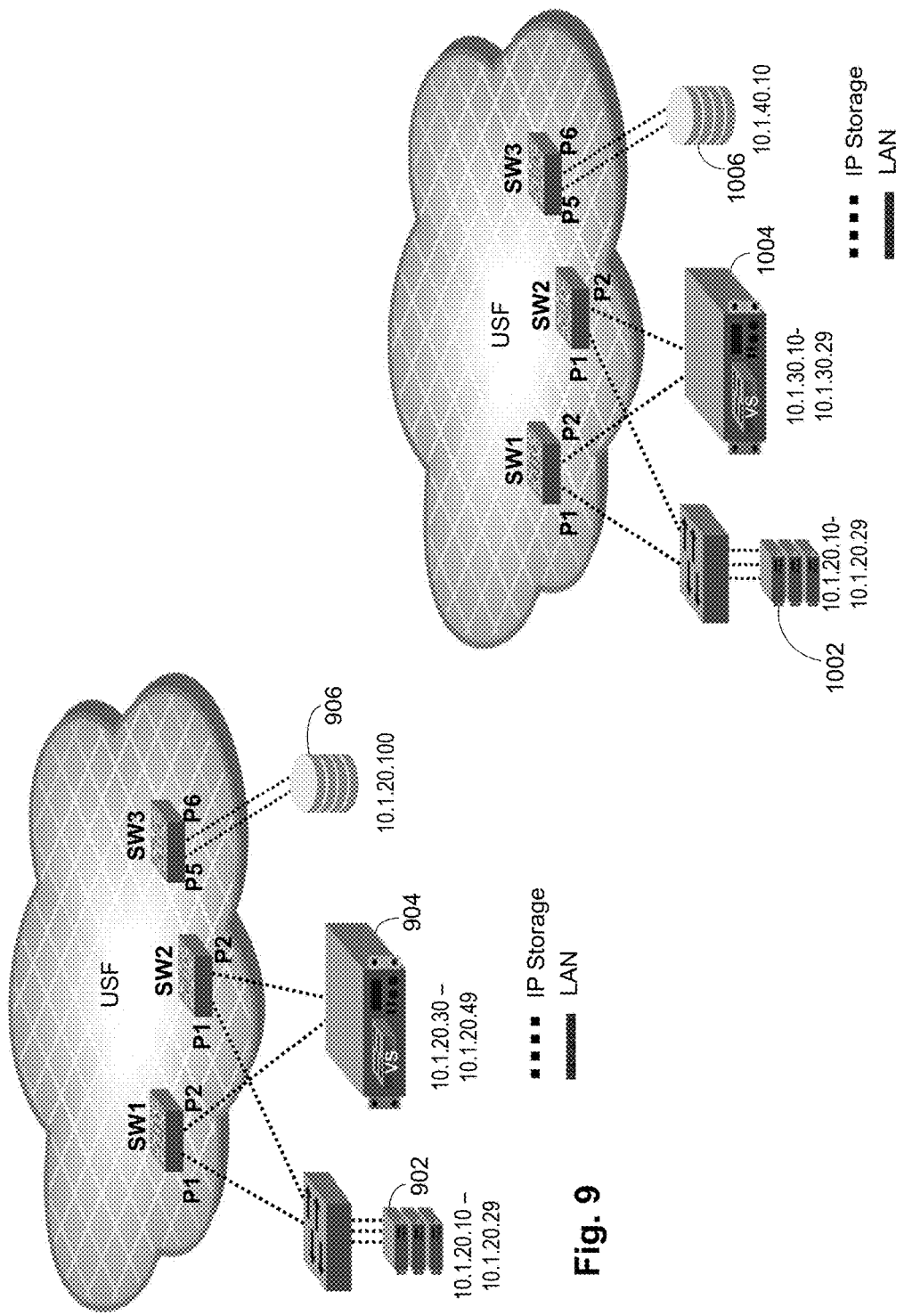
FIG. 9 is a first block diagram of a network according to the present invention illustrating network provisioning.
FIG. 10 is a second block diagram of a network according to the present invention illustrating network provisioning.
Figure 11:
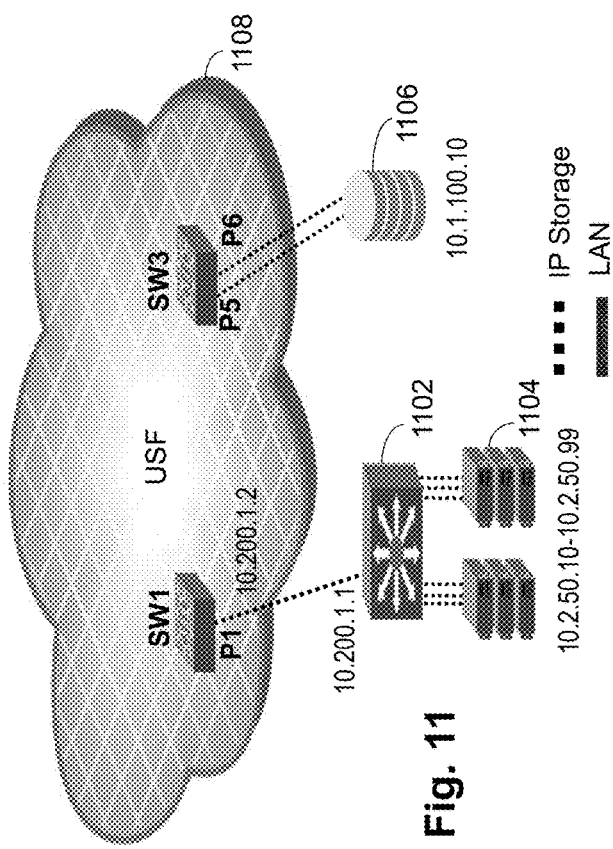
FIG. 11 is a third block diagram of a network according to the present invention illustrating network provisioning.

Various combinations of IP addresses are shown in FIGS. 9-11. In FIG. 9, the servers 902, the virtualization server 904 and the storage unit 906 are all in a single /24 subnet, in the illustrated case the 10.1.20 subnet. In FIG. 10, the servers 1002, the virtualization server 1004 and the storage unit 1006 are all in different /24 subnets, the 10.1.20, 10.1.30 and 10.1.40 subnets, respectively. In FIG. 11, an L3 TOR switch 1102 is present, with servers 1104 connected to the L3 TOR switch 1102. A storage unit 1106 is directly connected to the USF 1108. The L3 TOR switch 1102, the servers 1104 and the storage unit 1106 are on different /16 subnets, the L3 TOR switch 1102 on 10.200.1, the servers 1106 on 10.2.50 and the storage unit 1106 on 10.1.100. The USF 1108 is configured to route between the 10.1.100 and 10.200.1 addresses, while the L3 TOR switch 1102 is configured to route between the 10.200.1 and 10.2.50 addresses.

As can be seen, the address assignments and routing in the various embodiments is very flexible.

Figure 12:
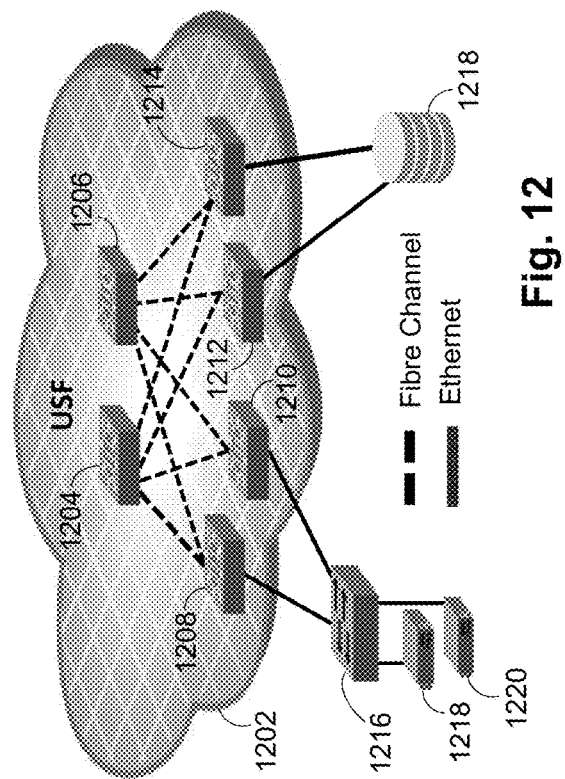
FIG. 12 is a block diagram of a network according to the present invention illustrating redundancy and multi-pathing.

FIG. 12 illustrates redundancy and multi-pathing performed in a USF according to a preferred embodiment. A USF 1202 is formed by USF switches 1204, 1206, 1208, 1210, 1212, 1214, where USF switches 1204, 1206 are connected to each of USF switches 1208, 1210, 1212, 1214. A storage unit 1218 is connected to USF switches 1212, 1214. An L2 switch 1216 is connected to USF switches 1208, 1210. Servers 1220 are connected to the L2 switch 1216. In this configuration, there are two paths from the L2 switch 1216 to the storage unit 1218, providing good redundancy and multi-pathing.

Figure 13:
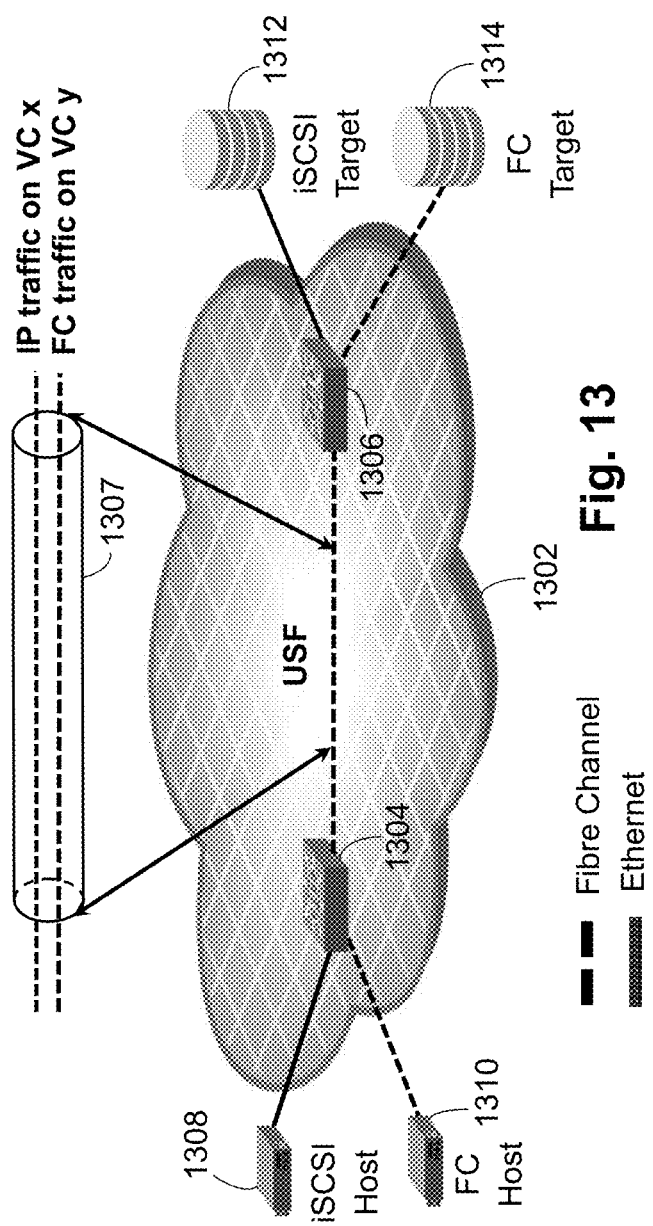
FIG. 13 is a block diagram of a network according to the present invention illustrating traffic isolation in the USF network.

FIG. 13 illustrates that different virtual channels (VCs) are used on the FC ISLs (inter-switch links) to provide traffic isolation in the FC fabric of a USF. A USF 1302 has two connected USF switches 1304, 1306. The USF switches 1304, 1306 are connected by an FC ISL 1307. As is well known, FC ISLs have a series of virtual channels (VCs) used to separate flows. In the preferred embodiments, IP traffic and FC traffic are carried on different VCs for traffic isolation. An iSCSI host 1308 and an FC host 1310 are connected to USF switch 1304, while an iSCSI target 1312 and an FC target 1314 are connected to USF switch 1306. Thus, the flow from the iSCSI host 1308 to the iSCSI target 1312 travels on a different VC from the flow from the FC host 1310 to the FC target 1314.

Figure 14:
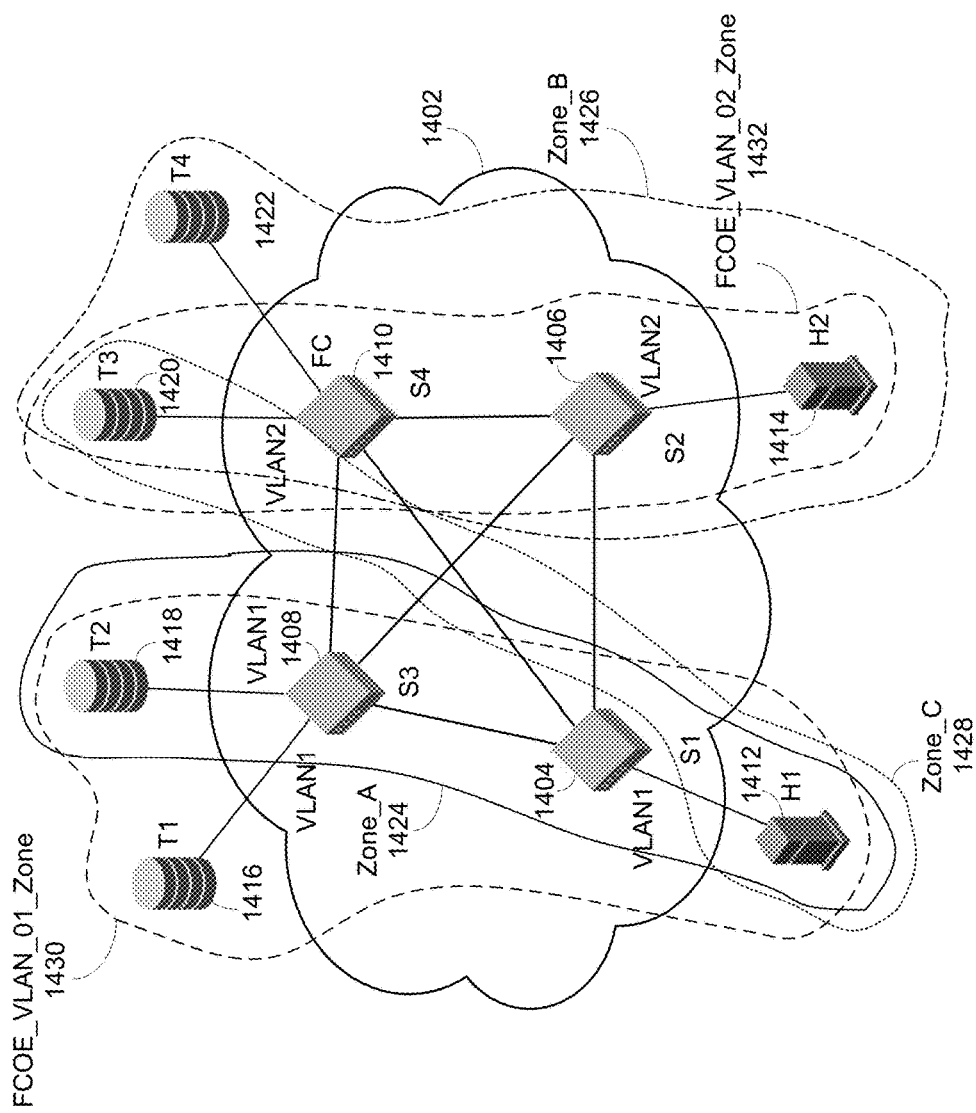
FIG. 14 is a block diagram of zoning in a network according to the present invention.

Referring to FIG. 14, a USF 1402 is formed by switch S1 1404, switch S2 1406, switch S3 1408 and switch S4 1410. In the illustrated embodiment, switch S1 1404 has an FCoE host H1 1412 connected, while switch S2 1406 has an FCoE host H2 1414 connected. An FCoE target T1 1416 and an FCoE target T2 1418 are connected to switch S3 1408. An FCoE target T3 1420 and an FC target T4 1422 are connected to switch S4 1410. Host H1 1412, target T1 1416 and target T2 1418 all are on VLAN 1, while host H2 1414 and target T3 1420 are on VLAN 2. Host H1 1412 and target T2 1418 are in a common Zone_A 1424. Host H2 1414, target T3 1420 and target T4 1422 are in a common Zone_B 1426. Host H1 1412 and target T3 1420 are in common Zone_C 1428.

According to FC zoning, two nodes are allowed to communicate only if they are in at least one common zone. Zoning is enforced in FC by two mechanisms, soft zoning and hard zoning. Soft zoning is performed using the name server and is done by providing only the devices in the same zone when a node queries for available nodes, which is normally done during the login process. More details on soft zoning are provided in U.S. Pat. No. 6,765,919, which is hereby incorporated by reference. Hard zoning is when each frame is inspected to ensure that frames are only being transmitted between allowed devices. More details are provided in U.S. Pat. No. 6,765,919 and in U.S. Pat. No. 7,167,472, which is hereby incorporated by reference. Additional details on zoning can be found in U.S. Pat. Nos. 6,980,525; 7,366,194; 7,352,740; 7,430,203 and 7,936,769, all of which are hereby incorporated by reference.

Fibre Channel zoning concepts are enhanced in a USF according to the present invention. In a first embodiment, VLAN information is added to the name server database to allow VLAN to be considered when performing soft and hard zoning. In a second embodiment, VLAN zones are automatically added to the zone database to aid in both soft zoning and hard zoning. As an overview, zoning is enhanced by requiring that for two FCoE devices to communicate, they must not only be in the same normally defined zone but also must be in the same VLAN or VLAN zone. This enhancement provides a method for an FC fabric to enforce normal VLAN restrictions for FCoE devices.

An FCOE_VLAN_01_Zone 1430 is shown in FIG. 14, as is an FCOE_VLAN_02_Zone 1432. These FCOE_VLAN zones reflect the automatically developed zones to correspond to the VLANs. As known, the name of the zone incorporates functional aspects of the zone, such as LSAN for LSAN zones. In the preferred embodiments, FCOE_VLAN_xx is used to indicate an FCoE-based VLAN zone, with xx representing the VLAN number.

FIG. 15 illustrates portions of a name server database augmented with VLAN information, in the provided example, the configuration of FIG. 14. Only portions of the name server database are illustrated for simplicity. Further details can be found in the Fibre Channel standards such as FC-GS-7 or documentation from various vendors. Columns 1504 for port ID; 1506 for worldwide name (WWN); 1508 for port symbol, here simplified to correspond to FIG. 14 and new 1510 for VLAN are illustrated. Host H1 1412, target T1 1416, target T2 1418, host H2 1414 and target T3 1420 are illustrated with their respective VLANs. Target T4 1422 does not have a VLAN entry as it is an FC device.

FIG. 16 illustrates portions of a zoning database 1602, with automatically added FCOE_VLAN zones included. Again, many portions are omitted for simplicity. As can be seen, there is an entry for each zone for each device in the network. For VLAN zones, the specific zone name is based on the VLAN number, thus representing this Ethernet parameter in the zoning database 1602. Further elements in the zone entry are conventional FC parameters, such as PDI and WWN. An entry including an FCOE_VLAN_xx_Zone zone name is distinguished from a zone name such as Zone_A, as the FCOE_VLAN_xx_Zone includes the VLAN number where Zone_A has no such information, the entry being just FC parameters.

Figure 17:
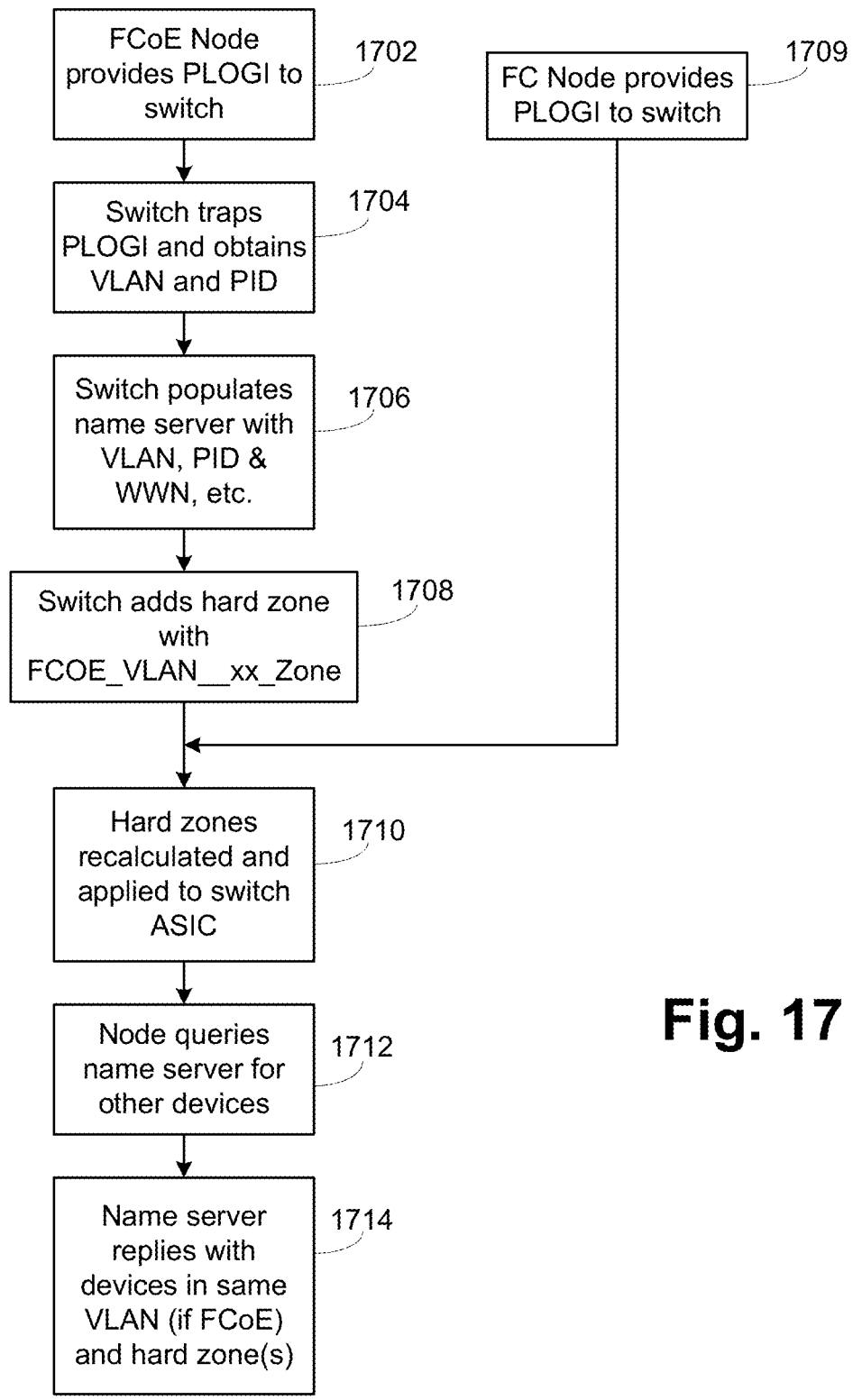
FIG. 17 is a flowchart of zoning operations of a switch in a network according to the present invention.

FIG. 17 illustrates operation for determining the VLAN, providing the VLAN entries into the name server database and the zoning database and installing the hard zoning. In step 1702, the FCoE node, such as host H1 1412 or target T3 1420, performs a port login (PLOGI) operation with the USF switch. In step 1704, the switch traps the FCoE frame and obtains the VLAN and PID from the frame, the VLAN being in the Ethernet header and the PID being the S_ID value in the FC header. In step 1706, the switch places the VLAN in the device entry in the name server database, the PID and WWN having been previously inserted during the fabric login (FLOGI) operation. In step 1708, the switch adds the FCOE_VLAN_xx_Zone entry into the zoning database, which includes the PID and the WWN being included in the entry to allow more flexible zoning, as is conventional.

In step 1709, an FC device performs a PLOGI with the switch as part of the FC device becoming operational. In step 1710, which follows step 1708 or step 1709, the switch determines the new hard zone information to apply to the switch ASIC. This is done by the switch first analyzing the zoning database to determine the relevant zones for the device being added, both conventional zones and FCOE_VLAN zones, if there are any. In some embodiments, FCOE_VLAN zones are not utilized, with the VLAN information only maintained in the name server database. The retrieved zones are evaluated for devices in common zones and if any devices in the common zones are FCoE devices, then if all of the FCoE devices are in the same VLAN. If the device being added is an FCoE device and all of the FCoE devices are not in the same VLAN, any device not in the VLAN of the device being added is omitted. In normal operation, this condition should not exist, as VLAN match is checked in the zone manager software when a device is being added to a zone, but this check provides a backstop for configuration errors. If the device being added is an FC device and all of the FCoE devices are not in the same VLAN, this is a misconfiguration, the device is not added and the error is flagged. Again, this condition should not occur because of the operation of the zone manager, but this test may be performed as a final check.

Following this evaluation, the name server database is inspected for each device to determine if the name server database indicates that a device has a VLAN entry. This check of the name server database is performed as some embodiments do not include the automatic development of the FCOE_VLAN zones and because FCOE_VLAN zones may deleted from the zoning database. If the name server database check indicates at least one FCoE device based on a VLAN entry, then all of the devices are checked to make sure they are all either in the same VLAN or not FCoE devices. Any devices that are FCoE devices and not in the same VLAN as the FCoE device being added are dropped from inclusion in the hard zoning deployment, though the same remarks as above apply that this condition should not normally exist. If the device being added is an FC device and not all of the FCoE devices are in the same VLAN, this is a misconfiguration, the device is not added and the error is flagged, as discussed above.

After the name server database inspection and VLAN check, the hard zones are deployed to the switch ASIC. The detailed mechanics of this operation depend on particular design of the hardware filtering logic in the switch ASIC but in general are based on analyzing the zoning database. The conventional hard zoning is enhanced according to the present invention by adding a further requirement that if two devices are FCoE devices they must be in the same VLAN, as described above.

In step 1712, the node queries the name server for available devices. This is conventional operation, as the node needs to determine the devices with which it can communicate. In step 1714, the switch replies with the devices in common zones with the querying node and if the querying node is an FCoE device, in the same VLAN if the other device is also an FCoE device. This is conventional soft zoning enhanced by the additional requirement that any FCoE devices must be in the same VLAN. This operation is performed similarly to the hard zoning deployment check, first checking the zoning database for common zones and FCOE_VLAN zones and then checking the name server database for VLAN entries. Similar to above, a device is returned only if in a common zone and in the same VLAN as a querying FCoE device. Again as above, if the querying device is an FC device and there is a VLAN mismatch of devices in common zones, such as host H1 1412 and target T3 1420, this is a misconfiguration, the device is not added and the error is flagged.

Referring back to FIG. 14, host H1 1412 would be able to communicate with target T2 1418 as both are in Zone_A and in VLAN 1, at least as indicated by being in the FCOE_VLAN_01_Zone. Host H1 1412 would not be able to communicate with target T1 1416 even though both are in the FCOE_VLAN_01_Zone because they are not in a common normal zone. Host H1 1412 would not be able to communicate with target T3 1420 because even though both are in normal Zone_C, they are not in the VLAN, at least as indicated by being in different FCOE_VLAN_xx_Zones. Host H2 1414 would be able to communicate with target T3 1420 and target T4 1422. All three are in Zone_B, meeting the first test. Host H2 1414 and target T3 1420 are both in VLAN2, so the enhanced VLAN requirement is also meet. Because target T4 1422 is an FC device, the enhanced VLAN requirement does not apply.

Figure 18:
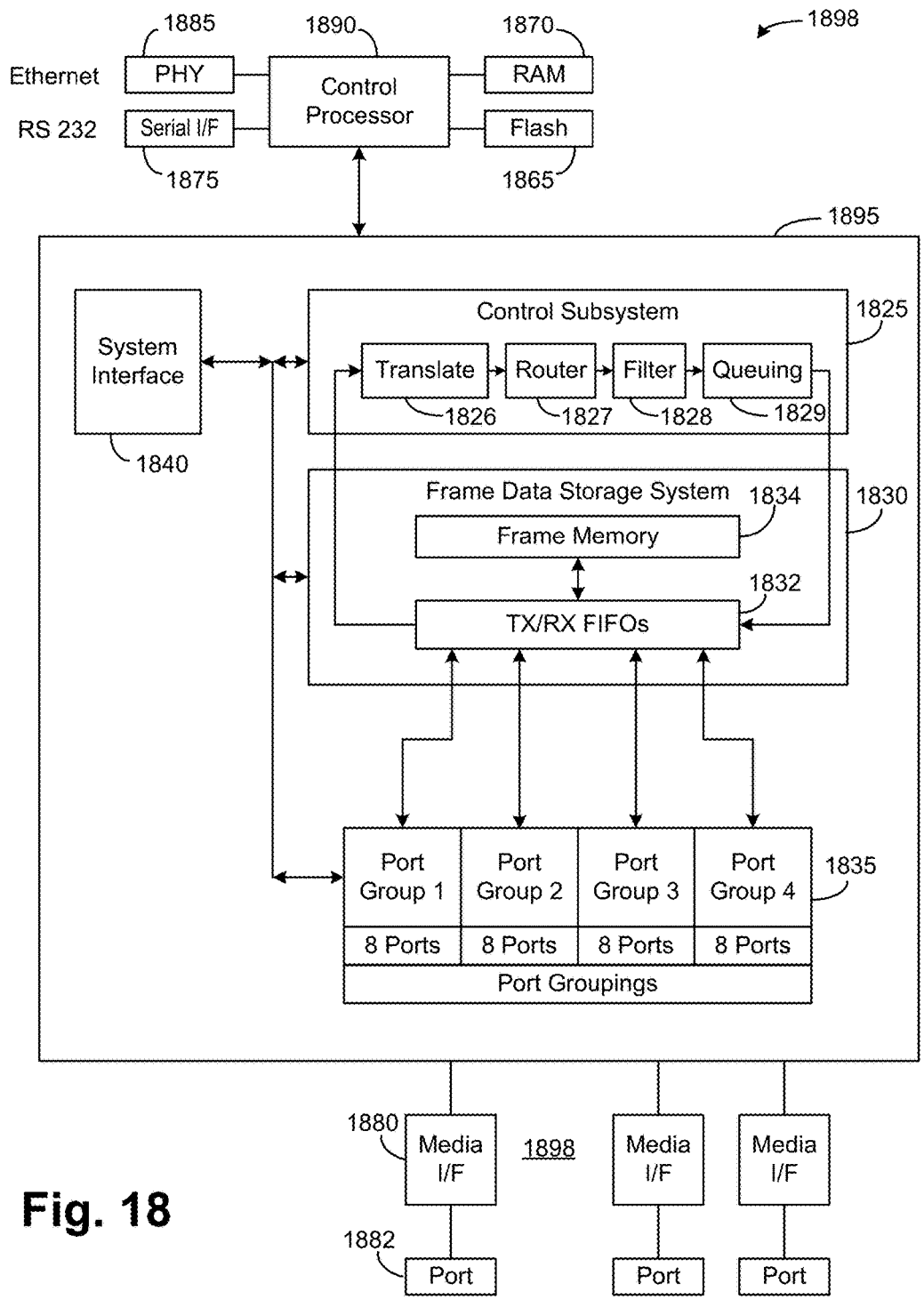
FIG. 18 is a block diagram of an exemplary switch according to the present invention.

FIG. 18 is a block diagram of an exemplary switch 1898. A control processor 1890 is connected to a switch ASIC 1895. The switch ASIC 1895 is connected to media interfaces 1880, which are connected to ports 1882. The media interfaces can be Ethernet or Fibre Channel as desired. Generally, the control processor 1890 configures the switch ASIC 1895 and handles higher-level switch operations, such as the name server, routing table setup, and the like. The switch ASIC 1895 handles general high-speed inline or in-band operations, such as switching, routing and frame translation. The control processor 1890 is connected to flash memory 1865 or the like to hold the software and programs for the higher level switch operations and initialization, such as the operating system, the name server, the zoning logic and the like; to random access memory (RAM) 1870 for working memory, such as the name server, zoning and route tables; and to an Ethernet PHY 1885 and serial interface 1875 for out-of-band management.

The switch ASIC 1895 has four basic modules, port groups 1835, a frame data storage system 1830, a control subsystem 1825 and a system interface 1840. The port groups 1835 perform the lowest level of packet transmission and reception. In the preferred embodiments, each port in the port groups 1835 can be configured to operate using Ethernet or Fibre Channel. Generally, frames are received from a media interface 1880 and provided to the frame data storage system 1830. Further, frames are received from the frame data storage system 1830 and provided to the media interface 1880 for transmission out of port 1882. The frame data storage system 1830 includes a set of transmit/receive FIFOs 1832, which interface with the port groups 1835, and a frame memory 1834, which stores the received frames and frames to be transmitted. The frame data storage system 1830 provides initial portions of each frame, typically the frame header and a payload header for FCP frames, to the control subsystem 1825. The control subsystem 1825 has the translate 1826, router 1827, filter 1828 and queuing 1829 blocks. The translate block 1826 examines the frame header and performs any necessary address translations, such as those that happen when a frame is redirected as described herein. There can be various embodiments of the translation block 1826, with examples of translation operation provided in U.S. Pat. Nos. 7,752,361 and 7,120,728, both of which are incorporated herein by reference in their entirety. Those examples also provide examples of the control/data path splitting of operations. The router block 1827 examines the frame header and selects the desired output port for the frame. The filter block 1828 examines the frame header, and the payload header in some cases, to determine if the frame should be transmitted. In the preferred embodiment of the present invention, hard zoning as described above and in the incorporated references is accomplished using the filter block 1828. The queuing block 1829 schedules the frames for transmission based on various factors including quality of service, priority and the like.

Various other patents and patent applications can be referenced to provide additional background for portions of this description. Those patents and applications include U.S. Patent Application Publication Nos. 2011/0299391, 2011/0286357, 2011/0268125, 2011/0299535, 2011/0268120, and 2011/0292947, which describe a VCS architecture where an Ethernet fabric is formed using a TRILL and Ethernet data layer and a combination TRILL and FC control layer, with these applications hereby incorporated by reference. An Ethernet Name Server (eNS) distribution service, which is used to maintain coherency of information among the various RBridges (RBs) is discussed in Publication No. 2011/0299535 incorporated above, to notify all other RBs of link establishment, status, etc. In addition, U.S. Patent Application Publication Nos. 2014/0269745, 2014/0301402 provide details of using an Ethernet fabric to connect FCoE hosts to other FCoE hosts and to an FC switch or an FCF. Both applications are hereby incorporated by reference.

Embodiments according to the present invention provide a Universal Storage Fabric, allowing FC and Ethernet storage devices to be connected to a single fabric that has the properties of an FC fabric. As FCoE devices can be connected to the USF, VLAN information is maintained in the name server database and automatically provided to the zoning database to provide assurances that FCoE operations are restricted to the proper VLAN, both by soft zoning and by hard zoning.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
accessing a database including at least two types of zones present in a fabric, a first type zone specifying devices by Fibre Channel parameters and a second type zone specifying devices by an Ethernet parameter and Fibre Channel parameters, where devices can be coupled to the fabric using either Fibre Channel or Ethernet connections, each zone including at least one device as a member of the zone; and
responsive to the zones accessed from the database, restricting communications between the devices coupled to the first fabric,
wherein the step of restricting communications between the devices includes:
programming a comparison circuit to evaluate fields in a frame, the fields including a source device address and a destination device address, and to provide an indication that the source device and the destination device can communicate only if the source and destination devices are members of a common first type zone and if both devices are coupled to the fabric using an Ethernet connection, that both devices are members of a common second type zone; and
evaluating a received frame using the comparison circuit.

2. The method of claim 1, wherein the Ethernet parameter is a virtual local area network value.

3. The method of claim 1, wherein programming a comparison circuit is performed using a zoning database.

4. The method of claim 3, wherein programming a comparison circuit is further performed using a name server database.

5. A switch comprising:
a plurality of ports, each port adapted to be coupled to a device by a serial connection;
a storage medium for storing a database including at least two types of zones present in a fabric, a first type zone specifying devices by Fibre Channel parameters and a second type zone specifying devices by an Ethernet parameter and Fibre Channel parameters, where devices can be coupled to the fabric using either Fibre Channel or Ethernet connections, each zone including at least one device as a member of the zone; and
a logic device coupled to the plurality of ports and to the storage medium, for, responsive to the zones accessed from the database, restricting communications for devices coupled to the plurality of ports, the logic device including:
a comparison circuit to evaluate fields in a frame, the fields including a source device address and a destination device address, and programmed to provide an indication that the source device and the destination device can communicate only if the source and destination devices are members of a common first type zone and if both devices are coupled to the fabric using an Ethernet connection, that both devices are members of a common second type zone.

6. The switch of claim 5, wherein the Ethernet parameter is a virtual local area network value.

7. The switch of claim 5, wherein the logic device further includes:
a CPU module; and
software executing on the CPU module to access the database and to program the comparison circuit.

8. The switch of claim 5, wherein programming the comparison circuit is performed using a zoning database.

9. The switch of claim 8, wherein programming the comparison circuit is further performed using a name server database.

10. A network comprising:
a plurality of external devices; and
a fabric coupling the plurality of external devices, wherein the fabric includes:
a plurality of ports for coupling to the plurality of external devices;
a storage medium for storing a database including at least two types of zones, a first type zone specifying devices by Fibre Channel parameters and a second type zone specifying devices by an Ethernet parameter and Fibre Channel parameters; and
a logic device coupled to the plurality of ports and to the storage medium, for, responsive to the zones accessed from the database, restricting communications for external devices coupled to the plurality of ports, the logic device including:
a comparison circuit to evaluate fields in a frame, the fields including a source external device address and a destination external device address, and programmed to provide an indication that the source external device and the destination external device can communicate only if the source and destination external devices are members of a common first type zone and if both external devices are coupled to the fabric using an Ethernet connection, that both external devices are members of a common second type zone.

11. The network of claim 10, wherein the Ethernet parameter is a virtual local area network value.

12. The network of claim 10, wherein the logic device further includes:
a CPU module; and
software executing on the CPU module to access the database and to program the comparison circuit.

13. The network of claim 10, wherein programming the comparison circuit is performed using a zoning database.

14. The network of claim 13, wherein programming the comparison circuit is further performed using a name server database.

* * * * *